(12) United States Patent
Guha

(10) Patent No.: US 11,135,742 B2
(45) Date of Patent: *Oct. 5, 2021

(54) VEHICLE COMPONENT BASED ON SELECTIVE COMINGLED FIBER BUNDLE POSITIONING FORM

(71) Applicant: J. & P. Coats, Limited, Uxbridge (GB)

(72) Inventor: Probir Kumar Guha, Bloomfield Hills, MI (US)

(73) Assignee: COATS GROUP PLC, Uxbridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,001

(22) Filed: Oct. 17, 2019

(65) Prior Publication Data
US 2020/0101641 A1 Apr. 2, 2020

Related U.S. Application Data

(63) Continuation-in-part of application No. PCT/US2018/027898, filed on Apr. 17, 2018.

(60) Provisional application No. 62/486,368, filed on Apr. 17, 2017, provisional application No. 62/486,288, filed on Apr. 17, 2017.

(51) Int. Cl.
| | |
|---|---|
| *B29B 11/16* | (2006.01) |
| *B29C 70/20* | (2006.01) |
| *B29C 70/34* | (2006.01) |
| *B29C 70/38* | (2006.01) |
| *B29C 70/46* | (2006.01) |
| *B29K 301/12* | (2006.01) |
| *B29L 31/30* | (2006.01) |

(52) U.S. Cl.
CPC ............ *B29B 11/16* (2013.01); *B29C 70/202* (2013.01); *B29C 70/34* (2013.01); *B29C 70/382* (2013.01); *B29C 70/46* (2013.01); *B29K 2301/12* (2013.01); *B29L 2031/30* (2013.01)

(58) Field of Classification Search
CPC ....... B29B 11/16; B29B 11/12; B29C 70/202; B29C 70/34; B29C 70/382; B29C 70/46; B29K 2101/12; B29K 2301/12; B29L 2031/30
See application file for complete search history.

(56) References Cited

U.S. PATENT DOCUMENTS

2018/0126674 A1* 5/2018 Ohtani .................. B29C 70/226

* cited by examiner

*Primary Examiner* — Lawrence D Ferguson
(74) *Attorney, Agent, or Firm* — Blue Filament Law PLLC

(57) ABSTRACT

A unitary reinforced composite based panel component, and methods of construction thereof is provided. The unitary reinforced panel component eliminates the need for adhesively joining an offset piece to the backside of a panel, to provide additional reinforcing strength thereby improving efficiency and eliminating bond-line read-through (BLRT). A vehicle component is prepared with resort to a preform made of selective comingled fiber bundle positioning (SCFBP) to selectively place co-mingled fibers that are enriched in carbon fiber as a reinforcement relative to other region that rely on a relatively higher percentage of glass fiber reinforcement to create such a preform.

10 Claims, 13 Drawing Sheets

VEHICLE COMPONENT BASED ON SELECTIVE COMINGLED FIBER BUNDLE POSITIONING FORM

RELATED APPLICATIONS

This application is a continuation in part of PCT/US2018/027898 filed 17 Apr. 2018 that in turn claims priority benefit of U.S. Provisional Application Ser. No. 62/486,368 filed 17 Apr. 2017, and U.S. Provisional Application Ser. No. 62/486,288 filed 17 Apr. 2017, the contents of which are hereby incorporated by reference.

FIELD OF THE INVENTION

The present invention in general relates to composite vehicle components and in particular to unitary reinforced composite based vehicle components, sewn reinforced composite preforms, and a method of construction thereof including thermoset resin overmolding of the preform.

BACKGROUND OF THE INVENTION

Weight savings in the automotive, transportation, and logistics based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

Composite materials are engineered or naturally occurring materials made from two or more constituent materials with significantly different physical or chemical properties which remain separate and distinct at the macroscopic or microscopic scale within the finished structure. There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

Commercially produced composites often use a polymer matrix material that is either a thermoplastic or thermoset resin. There are many different polymers available depending upon the starting raw ingredients which may be placed into several broad categories, each with numerous variations. Examples of the most common categories for categorizing polymers include polyester, vinyl ester, epoxy, phenolic, polyimide, polyamide, polypropylene, PEEK, and others.

The use of fiber and particulate inclusions to strengthen a matrix is well known to the art. Well established mechanisms for the strengthening include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM); hereafter referred to collectively as "molding compositions", fiber strengthening has traditionally involved usage of chopped glass fibers. There is a growing appreciation in the field of molding compositions that replacing in part, or all of the glass fiber in molding compositions with carbon fiber can provide improved component properties.

Liquid composite molding (LCM) and resin transfer molding (RTM) involve enveloping a preform structure in a thermoset resin matrix. The curable thermoset resin is used both neat and loaded with reinforcing particulate and fiber fillers. The preform can add strength to the resulting vehicle component; lower the overall density thereof through inclusion of a void volume, or a combination thereof.

The use of carbon fibers in composites, sheet molding compositions, and resin transfer molding (RTM) results in formed components with a lower weight as compared to glass fiber reinforced materials. The weight savings achieved with carbon fiber reinforcement stems from the fact that carbon has a lower density than glass and produces stronger and stiffer parts at a given thickness.

Fiber-reinforced composite materials can be divided into two main categories normally referred to as short fiber-reinforced materials and continuous fiber-reinforced materials. Continuous reinforced materials often constitute a layered or laminated structure. The woven and continuous fiber styles are typically available in a variety of forms, being pre-impregnated with the given matrix (resin), dry, uni-directional tapes of various widths, plain weave, harness satins, braided, and stitched. Various methods have been developed to reduce the resin content of the composite material, by increasing the fiber content. Typically, composite materials may have a ratio that ranges from 60% resin and 40% fiber to a composite with 40% resin and 60% fiber content. The strength of a product formed with composites is greatly dependent on the ratio of resin to reinforcement material.

There is a growing appreciation in the field of molding compositions that replacing in part, or all of the glass fiber in molding compositions with carbon fiber can provide improved component properties. However, the relative cost of carbon fiber relative to glass has slowed the acceptance of such preforms in the automotive, heavy truck, farm equipment, and earth moving equipment mass markets. Yet, the use of carbon fibers in composites, sheet molding compositions, and resin transfer molding (RTM) results in formed components with a lower weight as compared to glass fiber reinforced materials. The weight savings achieved with carbon fiber reinforcement stems from the fact that carbon has a lower density than glass and produces stronger and stiffer parts at a given thickness.

As thermoset and thermoplastics are increasingly being used to make vehicle body panels, in order to achieve weight reduction many such parts are formed with two components: an inner support portion that in cross section resembles a straw boater hat and is in some instances carbon fiber rich and imparts localized strengthening. The strengthening support structure is adhesively joined to an outer portion that forms a vehicle component such as a vehicle floor, a pickup truck bed liner, or a hood. Often this outer layer is glass fiber rich and provides the continuous surface of the component. In order to join these portions together adhesives are used that have considerable requirements as to strength and flexibility over a range of temperatures and the lifetime of a vehicle. FIG. 1 is a cross section of a prior art assembly 10 with a body panel seal flange 12 where an outer panel 14 is bonded with an adhesive 16 at the bond flange 12 of supporting rib 18.

However, an attribute of conventional adhesives is bondline read-through (BLRT) with about a 1 mm thick outer portion puckering around the adhesive bond line, and is a major source of distortions in bonded assemblies. BLRT is even more pronounced when there are compositional difference between the outer panel and a supporting rib (or inner panel) due to differential rates of thermal expansion. This traditional structure also complicates manufacture as two separate pieces must be molded, trimmed and finally joined to form the vehicle component.

BLRT is generally related to the use of adhesives to bond composite assemblies, and may be related to the elevated temperatures to cure the bond adhesive. While BLRT does not affect the structural integrity of the bonded assembly, uncontrolled distortion of vehicle components contributes to scrappage and slows vehicle assembly. While one solution to fix BLRT is to increase the thickness of a body panel, the increase in thickness also increases the weight of the panel, as well as the amount and cost of material used to form the panel, yet cannot diminish the additional steps needed to form the two elements and join them together.

In addition to BLRT with respect to composite assemblies, an additional hindrance to mass production of vehicle components with LCM or RTM is the inefficiency of preform production and the scrap produced by providing cutouts or modification of the preform prior to molding. Preforms formation by compressing chopped fibers relative to a preform mold is a comparatively slow process and the resulting perform is difficult to handle.

Thus, there exists a need to form a vehicle component by LCM or RTM based on a preform produced through the selective stitching of comingled fiber bundles to form a multilayer preform. There further exists a need to form a vehicle component that maintains the attractive attributes of a polymeric resin based vehicle component while avoiding the complexities of a two-element construction with an adhesive line therebetween.

SUMMARY OF THE INVENTION

A form for a vehicle component includes a comingled fiber bundle including a reinforcement fiber and optionally a thermoplastic fiber, the reinforcement fiber being glass fibers, aramid fibers, carbon fibers, or a combination thereof, where the comingled fiber bundle is laid out in a two-dimensional base layer that defines a shape of the form. A first successive layer formed with the comingled fiber bundle in contact with the two-dimensional layer, the comingled fiber bundle laid out in the first successive layer where a first ratio of the thermoplastic fibers, when present, to the reinforcement fibers varies from the comingled fiber bundle in the base layer. A second successive layer of the comingled fiber bundle is in contact with the first successive layer and vertically displaced from the two-dimensional base layer, the comingled fiber bundle laid out in the second successive layer where a second ratio of the thermoplastic fibers, when present, to the reinforcement fibers varies from the comingled fiber bundle in the base layer.

A method of forming a unitary reinforced composite component includes placing the form just described onto a mold platen, heating the form to promote fusion of any thermoplastic fibers therein, cooling the form until solidified with contours of the component, and removing the vehicle component from the mold platen.

A process of creating a vehicle component includes inserting a preform into a mold having a volume complementary in shape to the vehicle component. The preform includes a commingled fiber bundle composed of a reinforcement fiber and optionally thermoplastic fibers, where the reinforcement fiber being glass fibers, aramid fibers, carbon fibers, or a combination thereof. The commingled fiber bundle is laid out in a two-dimensional base layer that defines a shape of the preform. A first successive layer formed with the commingled fiber bundle is in contact with the two-dimensional layer, a second successive layer of the commingled fiber bundle in contact with the first successive layer and vertically displaced from the two-dimensional base layer. The thermoset resin is added to the volume, impregnating the preform with the thermoset resin, and the thermoset resin is cured to create the vehicle component.

A vehicle component formed by the process described.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
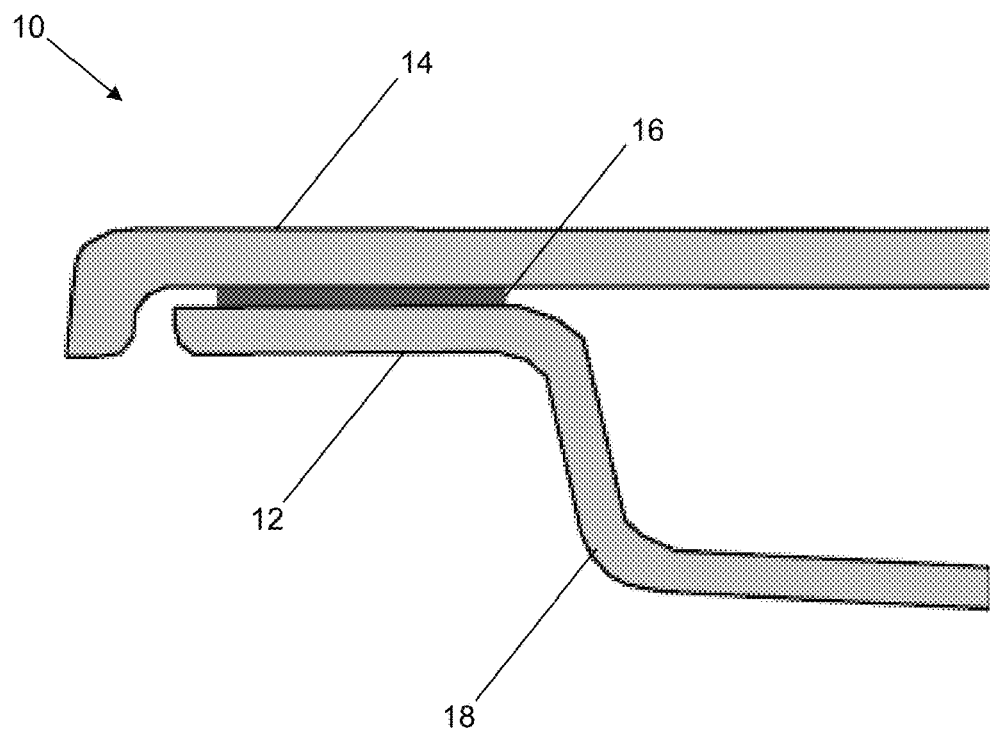
FIG. 1 is a cross section of a prior art body panel seal flange where the glass fiber based class A outer panel is bonded with an adhesive at a bond flange of a carbon fiber based structural inner panel.

The present invention has utility as a unitary reinforced composite based panel component, and methods of construction thereof. Embodiments of the inventive unitary reinforced panel component eliminate the need for adhesively joining an offset piece to the backside of a panel, to provide additional reinforcing strength thereby improving efficiency and eliminating bond-line read-through (BLRT). A vehicle component is prepared with resort to a preform made of selective comingled fiber bundle positioning (SCFBP) to selectively place co-mingled fibers that are enriched in carbon fiber as a reinforcement relative to other regions that rely on a relatively higher percentage of glass fiber reinforcement to create such a preform.

Embodiments of the inventive SCFBP perform, formed with continuous fiber bundles are stronger than those produced from chopped fibers. Additionally, as SCFBP can use automated sewing machines, the speed and reproducibility are high compared to chopping fibers and formed preforms therefrom, while retaining the lightweight of such preforms compared to metal preforms.

In specific inventive embodiments, comingled fibers of thermoplastics, glass, carbon, or a combination thereof are used to form a yarn that has predictable strength, and where the ratio of different fiber types is varied to create different properties along a given length. The comingled fiber based yarn may be used in the formation of the SCFBP forms, and are able to be embroidered directly into complex shapes thereby eliminating trimming waste and inefficient usage of comparatively expensive carbon fiber. In specific inventive embodiments, SCFBP forms include from 3 to 20 layers that vary in fiber types in three dimensions (3D). It is appreciated that number of layers can be increased beyond 20 and is limited only by the ability to sew through preceding layers. Additionally, as SCFBP is based on successive layer build up, new shapes of preforms can be developed relative to chopped fiber preforms. As SCFBP is analogous to three-dimensional printing, voids are readily formed by a successive layer being stitched to a substrate with a void therebetween by not compressing a fiber bundle against the substrate. Regardless of the shape of the preform, the preform is then overlayered with one or more of a woven or nonwoven fabric sheet. The fabric sheet being formed from thermoplastic fibers, glass fibers, polyaramid fibers, carbon fibers, or a combination thereof. The final panel is them formed by melting any thermoplastic fibers within the SCFBP form in contact with at least one mold platen complementary to the finished vehicle component so as to eliminate waste associated with trimming as well as the steps associated with forming a second support element and joining the two elements with adhesives in a fixture.

The multilayer preform is placed on a mold platen and subjected to LCM or RTM. In LCM, the liquid thermoset resin poured over the preform and the thermoset cured in the shape of the mold platen and at least one opposing mold platen, the platen collectively being complementary to the shape of the desired vehicle component. In RTM, catalyzed, thermoset resin is pumped into a closed mold under pressure, displacing the air at the edges of the mold, until the preform is enveloped and the mold is filled with curing resin.

Thermoset resins operative herein illustratively include vinyl esters, polyurethanes, epoxies, polyureas, benzoxazines, maleimides, cyanate esters, phenolics and polyimides. Each alone, a combination thereof, or in the presence of a foaming agent. It is appreciated that the thermoset resin can be used neat or loaded with chopped reinforcing fibers, particulate filler, or combinations thereof. Reinforcing fiber operative in the thermoset resin include those used in the continuous fiber bundles denoted with respect to reference numerals 40 and 40' as used in the figures.

According to embodiments of the present invention, an inventive preform is suitable to use with any known composite component processing technique, such as RTM, LCM, thermoplastic overmolding, injection molding, and the like.

Vehicle components formed from an inventive unitary reinforced composite based form that are based on an inventive thermoset resin overmolded preform illustratively include a vehicle bolster, vehicle post, a vehicle chassis, a pickup box, a cab load floor, a vehicle floor, a tailgate, a deck lid, a roof, a door panel, a fender, a wheel well, and body panels; farm equipment components, heavy truck components that illustratively include the aforementioned, drive cab and sleeping compartment sections; motor home floors and wall panels; and marine products such as decking, sound damping panels, and cockpit sections; and train car components illustratively including seats, flooring, roof sections, and walls.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

SCFBP-technology offers several advantages including:
varying the angle of fiber positioning during the lay-up process freely between 0 and 360°;
repeated fiber positioning on the same area allows for local thickness variations in the fiber form suited for a fiber composite component,
the conversion of the desired fiber orientation in a fiber positioning pattern for an embroidery machine requires minor development times and costs,
the process allows a near-net-shape production, which results in low waste and optimal fiber exploitation,
the ability to process a variety of fibers such as natural, glass, aramid, carbon (high strength and high modulus) and ceramic fibers.

Figure 2:
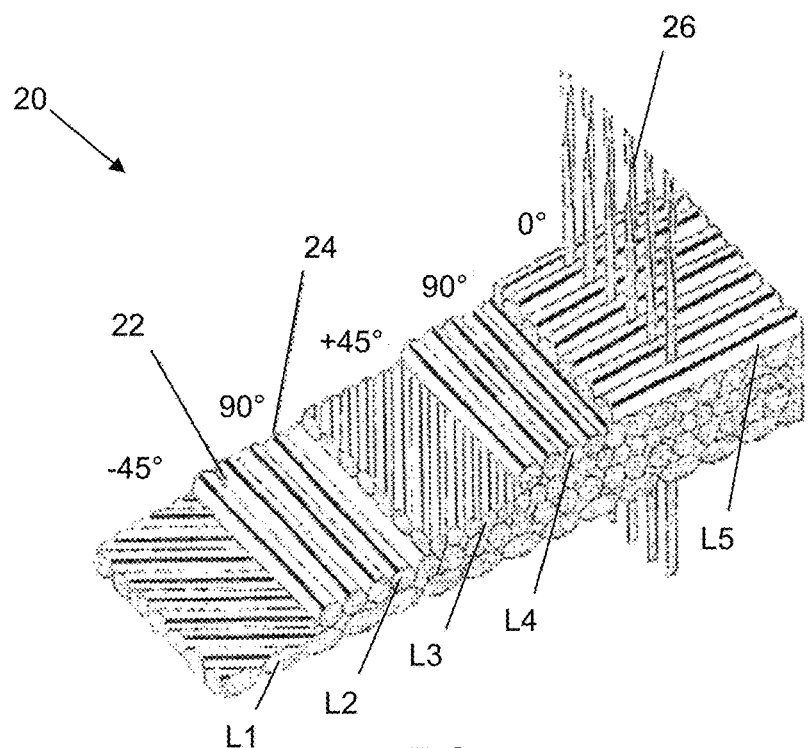
FIG. 2 is a perspective prior art view of a woven carbon and soluble fiber configuration with soluble stitching formed using selective comingled fiber bundle positioning (SCFBP)

FIG. 2 is a perspective prior art view of a selective commingled fiber bundle positioning (SCFBP) assembly 20 formed of woven carbon 22 and organic fibers 24 retained with stitching 26. The angles of the individual layers (L1, L2, L3, L4, L5) of woven carbon 22 and fiber 24 are varied the during the lay-up process.

In order to efficiently change yarn compositions, multiple sewing heads may be used, each sewing head loaded with a specific yarn composition and adding those regions desired to have a given yarn composition. Thermoplastic sewing thread is preferred to retain yarn in position as the shape of a vehicle component is developed. In a specific inventive embodiment, the SCFBP form may be skinned with a thermoplastic veil sheet prior to melting to yield the vehicle component.

As used herein, a veil includes woven sheets, non-woven sheets, and films of thermoplastics, glass, or aramids; or woven sheets, non-woven sheets of carbon fibers.

Figure 3:
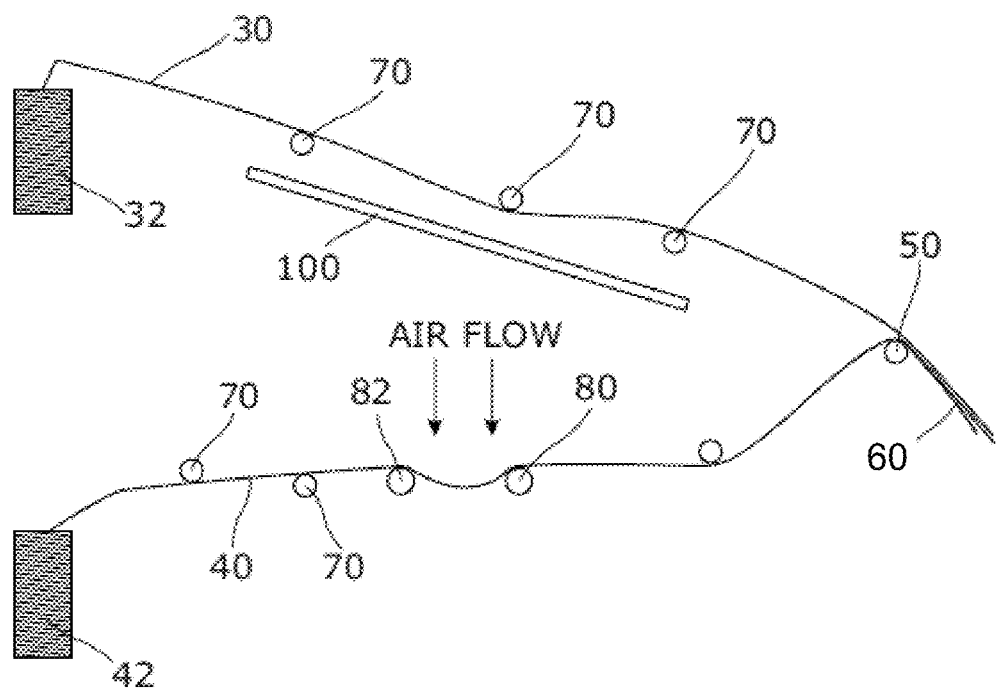
FIG. 3 is a side view of a prior art apparatus for manufacturing comingled yarn.

A prior art apparatus is shown in FIG. 3 for manufacturing comingled fibers as a roving 60 made up of comingled reinforcing fibers, illustratively including those made of carbon, glass, or aramid fibers, and thermofusible fibers which serve to provide a matrix in a composite material made of both reinforcing and matrix fibers. The matrix fibers, being of a thermofusible nature may be formed from material such as, for example, polyamide, polypropylene, polyester, polyether ether ketone, polybenzobisoxazole, or liquid crystal polymer. The reinforcing fibers may also be of a material that is meltable with the proviso that melting occurs at a temperature which is higher than the matrix fibers so that, when both fibers are used to create a composite, at the temperature point at which melting of the matrix fibers occurs, the state of the reinforcing fibers is unaffected.

Figure 4:
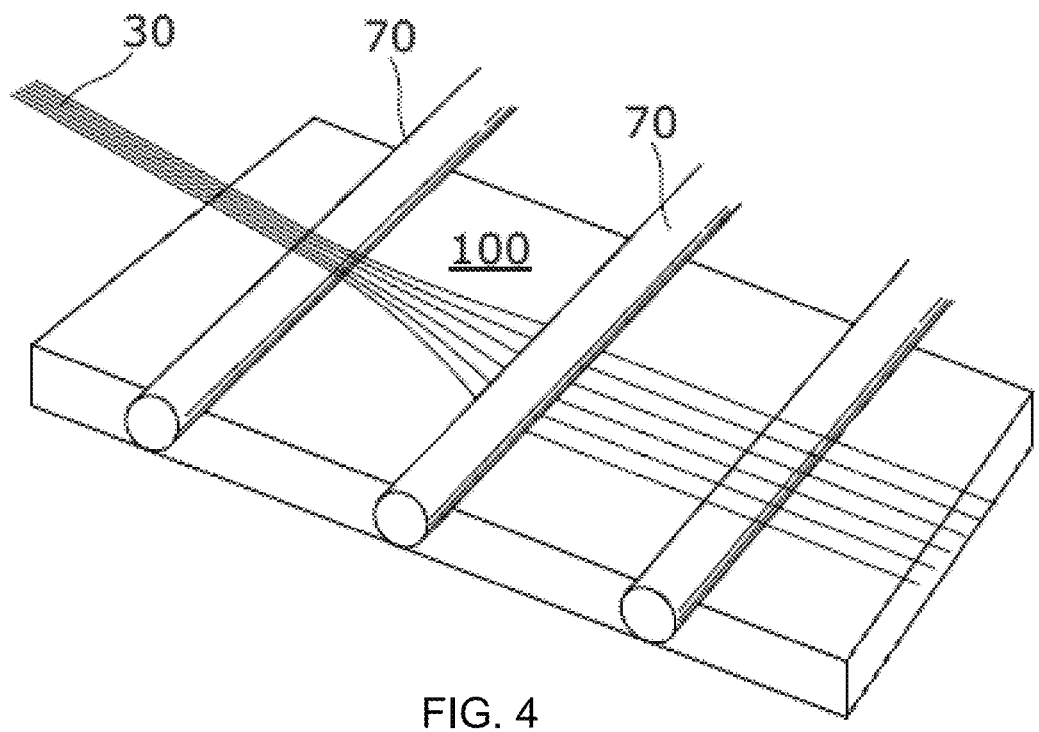
FIG. 4 is a perspective view of a detail of the prior art apparatus of FIG. 3.

The thermoplastic and carbon fibers are each fed from individual tows 30, 40 of pure thermoplastic fibers 30 and carbon fibers 40 and combined to form the roving 60 at a blending roller 50. The thermoplastic fibers are first drawn off a spool 32 to form the tow 30. Subsequently, the thermoplastic fibers of the tow 30 pass over and under a sequence of guide rollers 70 during which time the fibers are spread. The carbon fibers of the tow 40 are drawn off spool 42, and guided by guide rollers 70. Referring additionally to FIG. 4, the spreading of the thermoplastic fibers is created by the use of static electricity. Accordingly, as the thermoplastic tow 30 is drawn over and under the guide rollers 70 it passes over a charged plate 100. The electrostatic charge on the plate 100 is to cause mutual dispersal of the fibers due to electrostatic repulsion between them as a consequence of the charge acquired during their passage over the plate 100.

Figure 5:
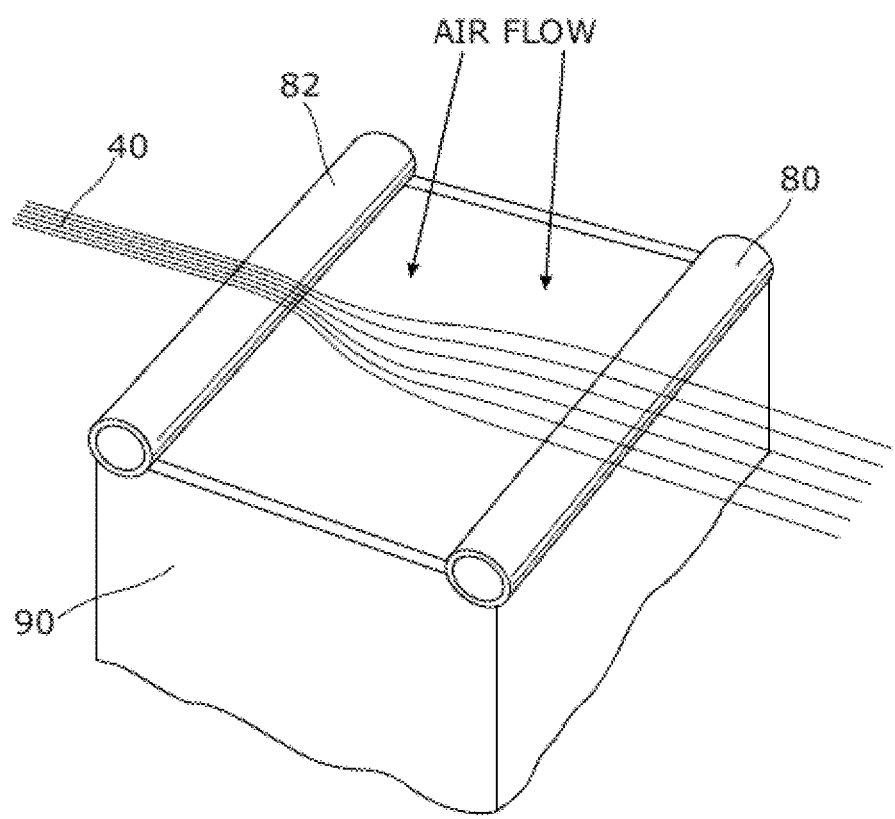
FIG. 5 is a perspective view of a further detail of FIG. 3.

Referring additionally to FIG. 5, the carbon fibers of tow 40 are spread by the use of a flow of air passing over the tow 40 which has the action of dispersing the fibers. The air flow passes transverse, and preferably substantially orthogonally to the length of the fibers of the tow 40. The air flow has the action of urging the tow 40 against a supporting surface and, as a consequence, of dispersing the fibers of the tow across that surface. The supporting surface extends transversely, and preferably substantially orthogonally to the length of the fibers (and therefore the motion of the tow) and a supporting surface is provided by a cylindrical mandrel 80. A further supporting surface, provided by a further mandrel 82 is provided upstream of the mandrel 80 and the action of the air flow in combination with the surfaces have, as a consequence of the fibers of the tow being urged against them by the air flow, a dispersing effect upon the fibers of the tow. The air flow is created by an air pressure differential across the movement of the tow 40 and the extent of the dispersal of the fibers on the supporting surface or surfaces is related to the air pressure gradient in the region of the tow 40 and mandrels (80, 82).

The present invention extends the existing technology to produce vehicle components by producing forms that are generally more layers than conventional SCFBP and in the general shape of a completed vehicle component. Through the strategic placement of carbon fiber in varying amounts within only some regions of the form, or with varying amounts within the preform, a vehicle component is formed that efficiently utilizes the comparatively expensive carbon fiber content to toughen the resulting vehicle component and/or in the regions conventionally toughened with a "hat section" reinforcement. According the present invention comingled fibers are retaining in series of two dimensional layers that are sequentially constructed by SCFBP.

The comingled fibers used in the present invention are composed of a reinforcement fiber and optionally thermoplastic fibers. Thermoplastic fibers operative herein illustratively include, polypropylenes, polyamides, polyesters, polyether ether ketones, polybenzobisoxazoles, polyphenylene sulfide; block copolymers containing at least one of the aforementioned constituting at least 40 percent by weight of the copolymer; and blends thereof. The thermoplastic fibers are appreciated to be recycled, virgin, or a blend thereof. The thermoplastic fibers in a comingled fiber bundle constitute from 20 to 80 weight percent of the comingled fibers in the present invention.

As used herein, any reference to weight percent or by extension molecular weight of a polymer is based on weight average molecular weight.

The reinforcement fibers in a comingled fiber bundle being glass fibers, polyaramid, carbon fibers, or a combination of any of the aforementioned. It is appreciated that the comingled fibers are either parallel to define a roving or include at some fibers that are helically twisted to define a yarn. It is appreciated that the physical properties of reinforcing fibers retained in a helical configuration within a fixed matrix of a completed vehicle component are different than those of a linear configuration, especially along the reinforcing fiber axis. The relative number of reinforcing fibers relative to the thermoplastic fibers is highly variable in the present invention in view of the disparate diameters of glass fibers, polyaramid fibers, and carbon fibers.

According to embodiments of the present invention, the comingled fiber bundle includes entirely reinforcing fibers and not thermoplastic fiber. Alternatively, the comingled fiber bundle includes both reinforcing fibers and thermoplastic fibers. As described throughout the present disclosure, the reinforcing fibers include carbon fiber, glass fiber, aramid fibers, or a combination thereof.

An inventive form or preform is created by laying out one or more comingled fiber bundles on a substrate as a two-dimensional base layer that defines a shape of the form or preform with stitching applied to retain the comingled fibers in a desired placement on the substrate. As is conventional to SCFBP, the substrate can be removed after production of the form, else it is retained and thereby incorporated into the resulting vehicle component. In certain inventive embodiments, the stitching is a thermoplastic thread or a metal wire. The thermoplastic thread in some inventive embodiments is formed of the same thermoplastic present in the comingled fiber bundle. It is appreciated that the thread diameter and melting temperature of the thread used for stitching are variables that are readily selected relative to the properties of comingled fiber bundle. In some embodiments, the substrate is retained and adds the toughness of the resulting vehicle component. Exemplary substrates for SCFBP are disposable films, thermoplastic fabrics, fiberglass fabric, carbon fiber fabrics, polyaramid fabrics, and co-blends of any of the aforementioned, alone or in combination with thermoplastic or naturally occurring fibers. Thermoplastic fibers or fabrics include the aforementioned polymers recited above with respect to the SCFBP, while naturally occurring fibers illustratively include cotton, linen, jute, bamboo and silk.

According to embodiments of the present invention, the stitching thread is a thermoplastic thread, glass fiber thread, carbon fiber thread, aramid fiber thread, a metal wire, or a combination thereof. The thread diameter and thread material used for stitching are variables that are readily selected relative to the properties of comingled fiber bundle and the desired properties of the resulting preform and vehicle component.

As used herein, the term melting as used with respect to thermoplastic fibers or thread is intended to encompass both thermofusion of fibers such that a vestigial core structure of separate fibers is retained, as well as a complete melting of the fibers to obtain a homogenous thermoplastic matrix.

Figure 6:
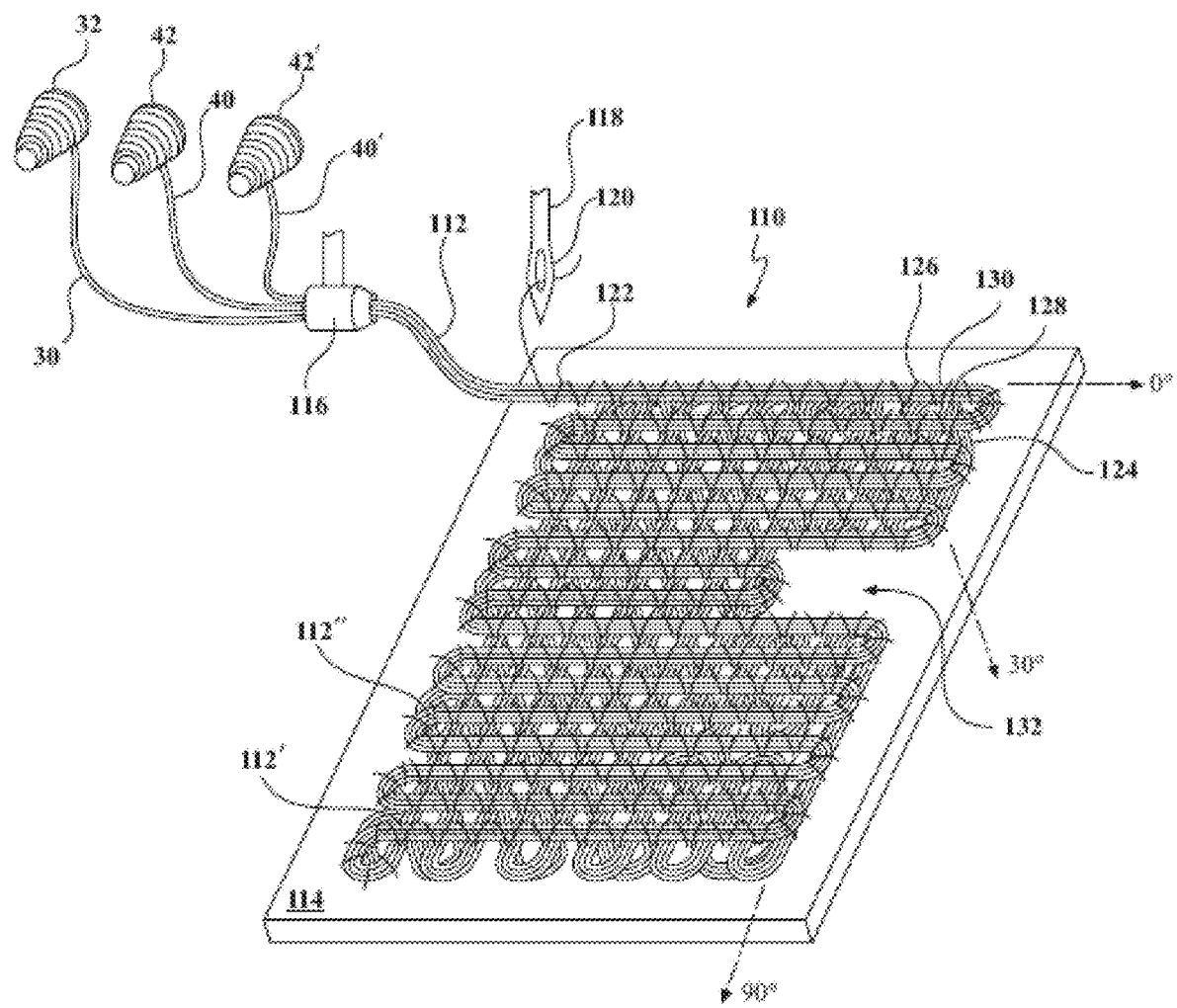
FIG. 6 is a schematic illustrating a SCFBP form created from a continuous fiber bundle according to the present invention.

As shown in FIG. 6, in which like reference numerals have the meaning previously ascribed thereto, an inventive form/preform 110 is in the process of being created. A spool 32 contributes thermoplastic fiber 30, while at least one additional spool 42 and 42' of reinforcing fiber is combined with the thermoplastic fiber 30 to yield a comingled fiber bundle 112. Central to the present invention is the modification of the percentage of carbon fiber reinforcing fiber relative to: other types of reinforcing fiber used in form 110, the total percentage of reinforcing fiber, or a combination thereof. While spool 42 contributes carbon fiber 40 to the comingled fiber bundle 112, spool 42' is provides glass fiber or polyaramid, shown generically at 40'. It is appreciated that multiple additional spools of various types of fibers beyond the three depicted in FIG. 6 are readily used to form a comingled fiber bundle 112, yet these additional spools are not depicted for visual clarity. The process of creating a comingled fiber bundle 112 from the fibers 30, 40, and 40' is summarized in the prior art above and routinely performed commercially. It is appreciated that any given reinforcing fiber 30, 40, or 40' is readily cut, creating a length of comingled fiber bundle 112 that lacks at least one of the reinforcing fibers 30, 40, or 40'. Upon feeding the cut end of the depleted fiber back into the cording or other conventional equipment that affords the comingled fiber bundle 112 as an output, the omitted reinforcing fiber 30, 40, or 40' is reinserted and present in that portion of the form 110.

The comingled fiber bundle 112 is conveyed to a substrate 114 by a guide pipe 116 to lay out the comingled fiber bundle 112 in predetermined pattern on the substrate 114. A conventional sewing machine head operating a needle 118 with a top thread 120 tacks the comingled fiber bundle 112 with stitches 122. A bobbin below the substrate 114, includes a bobbin with a lower thread are not shown, and are conventional to sewing machines. The top thread 120 and the bottom thread are thermoplastic threads. In certain inventive embodiments, the comingled fiber bundle 112 is laid out in a base layer 124 in generally parallels lines with a given orientation. Switchback turn regions 126 are commonly used to lay out parallel lines of comingled fiber bundle 112. As shown in FIG. 6, base layer 124 has an orientation of 30 degrees, while a first successive layer 128, and a second successive layer 130 have orientations of 90 degrees and 0 degrees, respectively. This is best seen in the notch region 132 in the form 110. The comingled fiber bundle 112 that is enriched in carbon fiber is depicted as shaded and designated at 112' relative to comparatively carbon fiber depleted comingled fiber bundle 112". As a result of the present invention, the form 110 includes specific features such as the notch region 132 that conventionally would be cut from a base piece. In this way, the present invention eliminates the cutting step, as well as the associated waste generation. In addition to the substantially linear pattern of comingled fiber bundle positioning depicted in FIG. 6 with interspersed switchbacks, it is appreciated that other patterns operative herein illustratively include spirals, and any space filling curve such as a Peano curve, dragon curve, or Sierpinksi curve.

If zero degrees is defined as the long axis of the base layer 124, the subsequent layers are overlaid at angles of 0-90°. For example, an angular displacement between adjacent layers is 45° resulting in a 0-45-90-45-0 pattern of layers. Further specific patterns illustratively include 0-45-90-45-0, 0-45-60-60-45-0, 0-0-45-60-45-0-0, 0-15-30-45-60-45-30-15-0, and 0-90-45-45-60-60-45-45-90-0. While these exemplary patterns are for from 5 to 10 layers of directional SCFBP, it is appreciated that the form 110 may include from 3 to 20 layers. It is appreciated that the form layers may be symmetrical about a central layer, in the case of an odd number of layers, or about a central latitudinal plane parallel to the players.

The stitching 122 is applied with a preselected tension, stitching diameter, stitch spacing. The stitching 122 is typically present in an amount of from 0.1 to 7 weight percent of the comingled fiber bundle 112' or 112".

While FIG. 6 only shows three layers, it is appreciated that a form 110 is readily formed with up to 20 layers with the only technical limit being the length of the travel of the needle 118. While comingled fiber bundle 112" has a first ratio of said thermoplastic fibers to said reinforcement fibers, comingled fiber bundle 112' have a different ratio therebetween. These ratios in a prototypical embodiment of the present invention varying between layers 124 and 128 of the form or preform 110.

Figure 7:
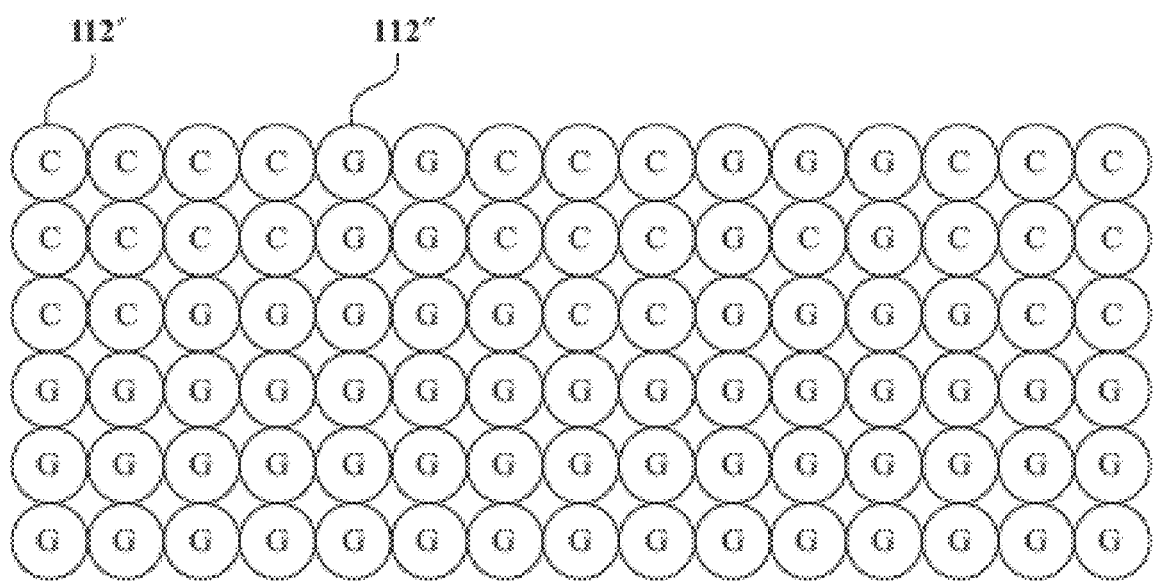
FIG. 7 is a cross section representation of a SCFBP form, where C stands for a carbon fiber rich comingled fiber bundle and G stands for glass fiber rich comingled fiber bundle, in accordance with embodiments of the invention.

A cross-sectional view of an exemplary form similar to form or preform 110 is shown in FIG. 7 with seven layers, where C denotes a carbon fiber enriched comingled fiber bundle 112' and G denotes a carbon fiber depleted comingled fiber bundle 112" to illustrate regions of selective toughening to enforce the edges and center of the form. In this way carbon fiber is used efficiently. In contrast to the form 110, with adjacent layers varying in angle, FIG. 7 shows the adjacent layers parallel for visual clarity. No stitches are shown for visual clarity.

Figure 8:
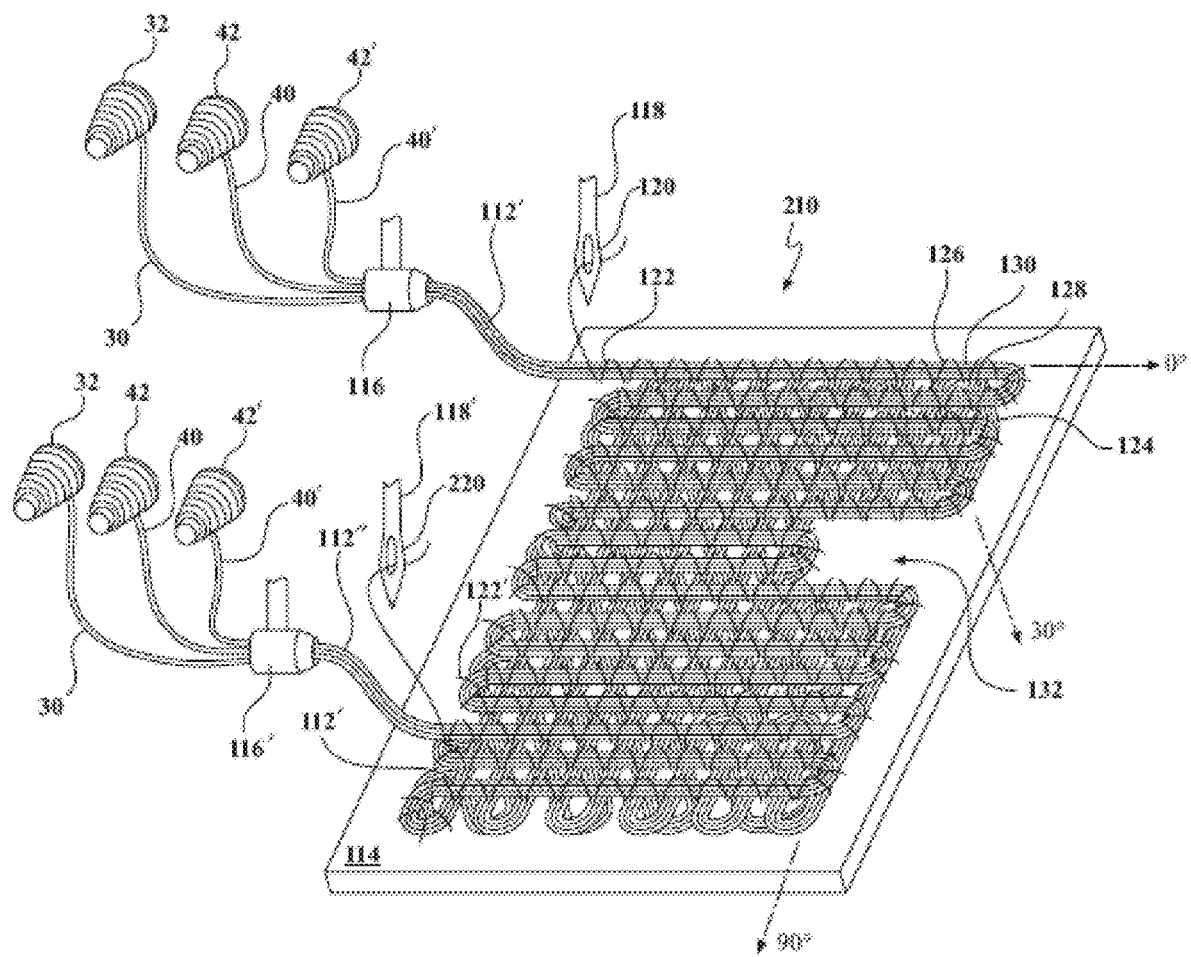
FIG. 8 is a schematic illustrating a SCFBP form created from multiple continuous fiber bundles according to the present invention.

As shown in FIG. 8, in which like reference numerals have the meaning previously ascribed thereto, an inventive form 210 is in the process of being created. This embodiment varies from that detailed with respect to FIG. 6 in that a second conventional sewing machine head' operating a needle 118' with a top thread 220 tacks a devoted carbon depleted comingled fiber bundle 112" with stitches 122'. Duplicate spools 32, 42, and 42' feed fibers 30, 40, and 40' respectively to a duplicate guide pipe 116' to form comingled fiber bundle 112". A second bobbin below the substrate 114, includes a bobbin with a lower thread are not shown, and are conventional to sewing machines. The top threads 120 and 220, can be the same or different and likewise the bottom threads. The needle 118 in FIG. 8 now is devoted to only applying a uniform comingled fiber bundle 112' that is enriched in carbon fiber relative to 112". While only two separate sewing heads are shown in FIG. 8, it should be appreciated that additional sewing heads are readily used to simultaneous stitch comingled fiber bundles to create a form. This being especially the case when the form is for a large area form as might be employed in a vehicle component such as a floor. Patterns as detailed with respect to FIG. 6 are readily formed in this embodiment.

Figure 9:
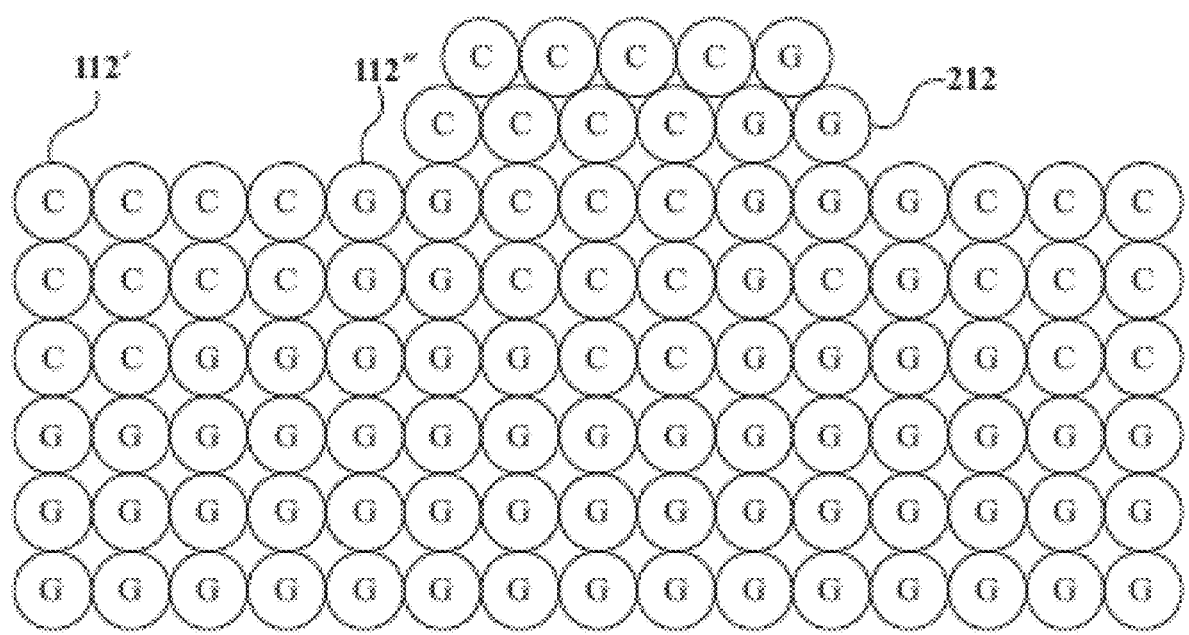
FIG. 9 is a schematic illustrating a SCFBP form created according to the present invention with partial layers extending from a top surface with a void underlying a top surface, with the naming convention used in FIG. 7.

FIG. 9 is a cross-sectional view of a SCFBP form or preform created according to the present invention per either FIG. 6 or FIG. 8 with two partial layers 212 extending from a top surface of a seven-layer inventive form, with the common naming convention used with respect to FIG. 7. A partial layer 212 is formed simply by applying a comingled fiber bundle as an incomplete top layer during the SCFBP process. In certain inventive embodiments, the partial layer 212 is a majority by weight in partial layer 212 is the carbon enriched comingled fiber bundle 112', in which like reference numerals have the meaning previously ascribed thereto. In still other inventive embodiments, the partial layer 212 is solely the carbon enriched comingled fiber bundle 112'. In contrast to the form 110 or 210, with adjacent layers varying in angle, FIG. 9 shows the adjacent layers parallel for visual clarity. No stitches are shown for visual clarity.

Figure 10:
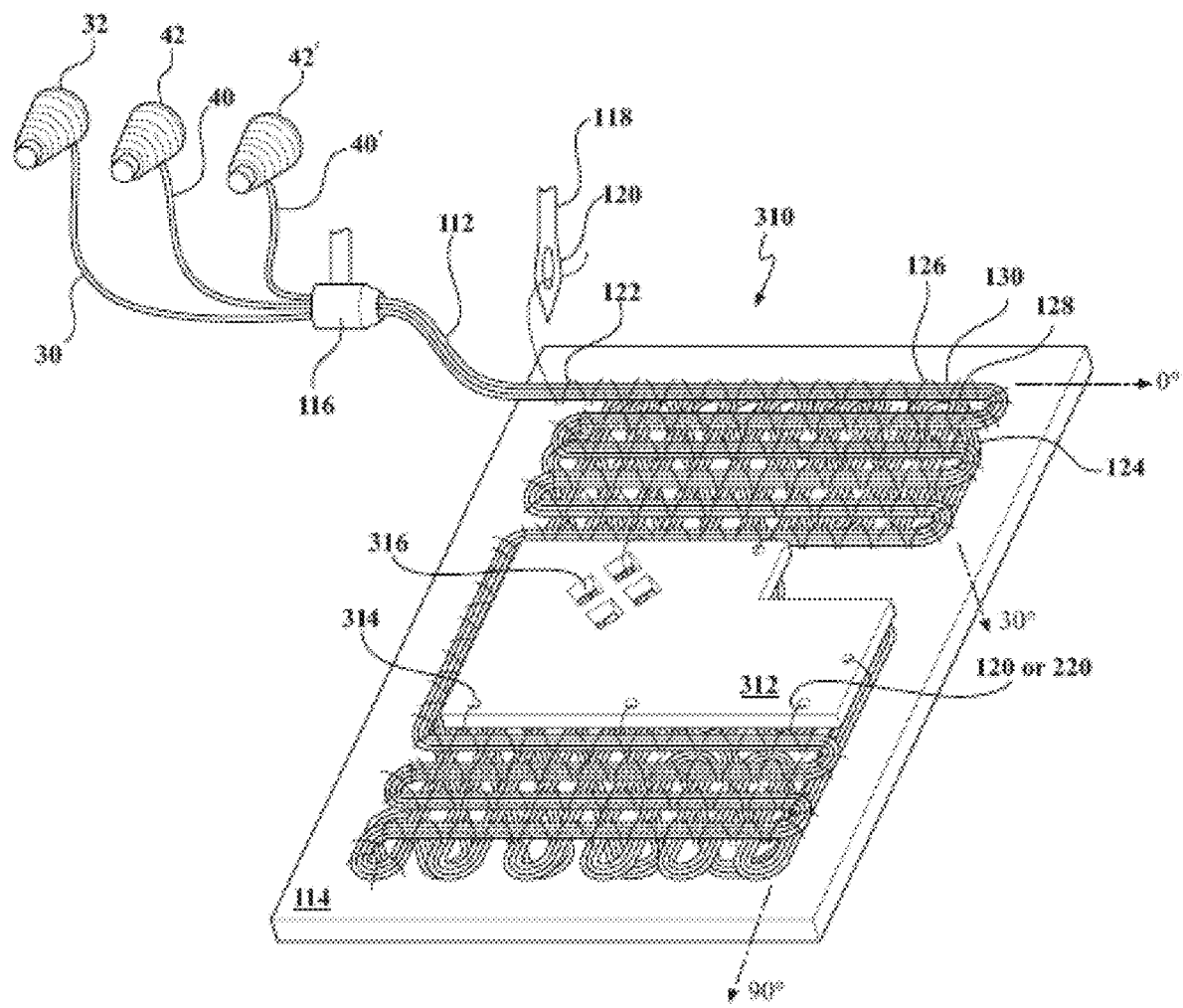
FIG. 10 is a schematic illustrating a SCFBP form created according to the present invention inclusive of a disparate material strut.

As shown in FIG. 10, in which like reference numerals have the meaning previously ascribed thereto, an inventive form 310 is in the process of being created. This embodiment varies from that detailed with respect to FIG. 6 in that a mechanically supporting strut 312 is stitched into the form or preform 310. The strut 312 is in certain inventive embodiments a full density composite material having a higher stiffness per unit area relative to a vehicle component area created by melting the thermoplastic content of form or preform 110 or 210 or curing resin to impregnate the form or preform 110 or 210, a sewable polymeric foam that is either open-celled or close-celled, or an expanded structure. It is appreciated that a fully densified strut 312 is formed of carbon fiber rich composite or sewing needle pierceable metal, the aforementioned with either smooth surfaces or contoured to improve strength properties through corrugation, dimpling, or imposing a hexagonal pattern embossment therein. Preformed holes 314 in the insert 312 are present in certain inventive embodiments that are sized and spaced to receive thread 120 or 220. In an alternate embodiment, the strut 312 is an expanded hexagonal or rhombohedral holes 316 formed of metal or plastics. Aluminum honeycomb grid core mesh is exemplary thereof. In still other inventive embodiments, the strut 312 is placed in a top layer of a form 310 to avoid having to maintain alignment with holes 314 or otherwise continue to stitch and a second form, such as 110 or 210 is inverted and laid on top of the strut 312 to encompass the strut 312 in SCFBP forms. In still other inventive embodiments, a veil is overlaid on the top surface of form 310 to encompass a top layer strut in thermoplastic material. It is appreciated that an insert 312 with a thread hole or a threaded bolt extending therefrom are well-suited as a hard point for fixturing or hingeably attaching the finished vehicle component to the vehicle as a whole.

While the inclusion of a strut 312 in a form or preform is illustrated in FIG. 10 relative to FIG. 6, it is appreciated that a strut 312 is also readily employed with the multiple sewing head embodiment detailed with respect to FIG. 8.

Figure 11A:
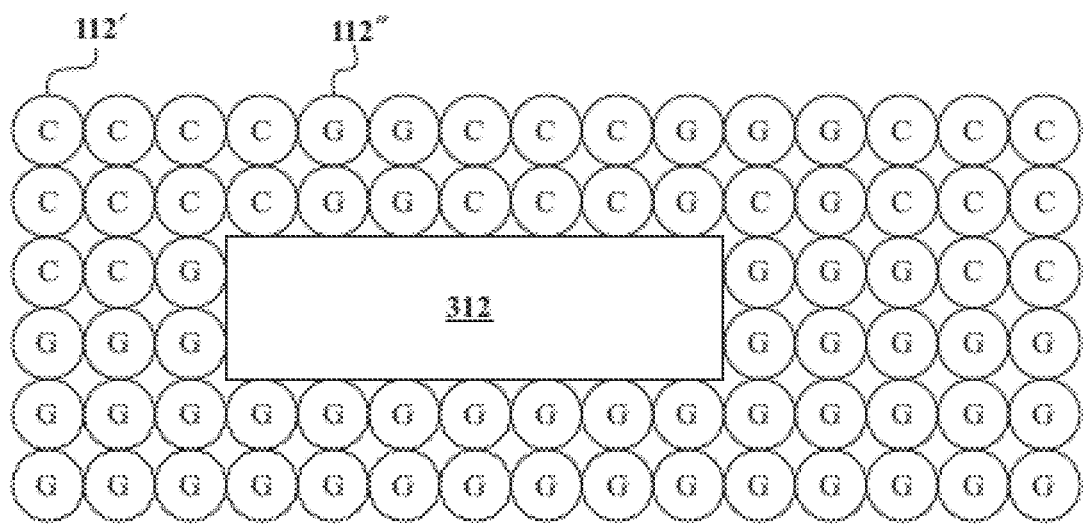
FIG. 11A is a cross section representation of a SCFBP form with a reinforcing strut in accordance with embodiments of the invention, with the naming convention used in FIG. 7.
Figure 11B:
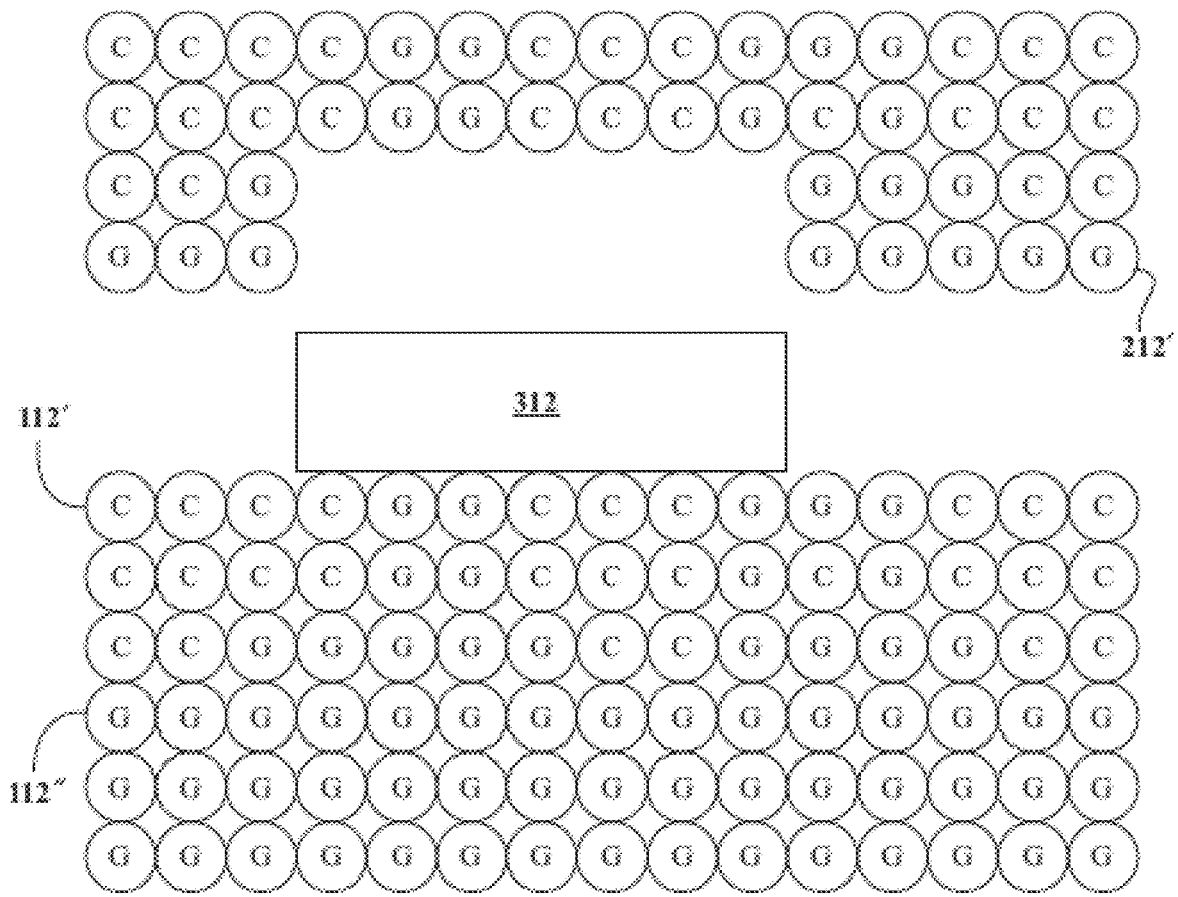
FIG. 11B is a cross-section representation of a SCFBP form with a top placed reinforcing strut and an inverted form as shown in FIG. 7 that is complementary thereto.

FIG. 11A is a cross-section representation of the form or preform 310 with a reinforcing strut 312 using a common naming convention relative to FIG. 7. FIG. 11B is a cross-section representation of the form 310 or preform 310 with a top placed reinforcing strut 312 and an inverted form similar to that shown in FIG. 9 and with partial layers 212' that are complementary thereto. No stitches are shown for visual clarity.

Figure 12A:
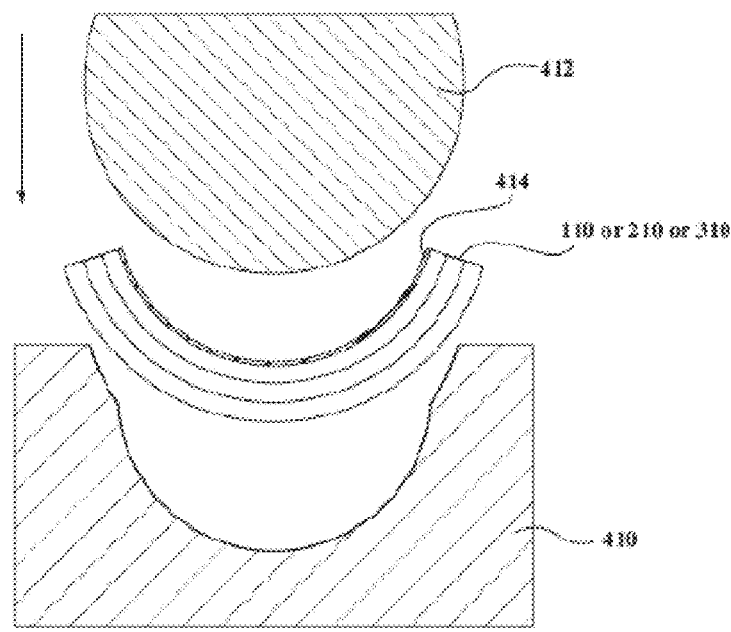
FIGS. 12A-12D are a sequence of schematic steps of processing an inventive SCFBP form into a vehicle component by melting any thermoplastic content of the SCFBP form or by resin transfer molding.
Figure 12B:
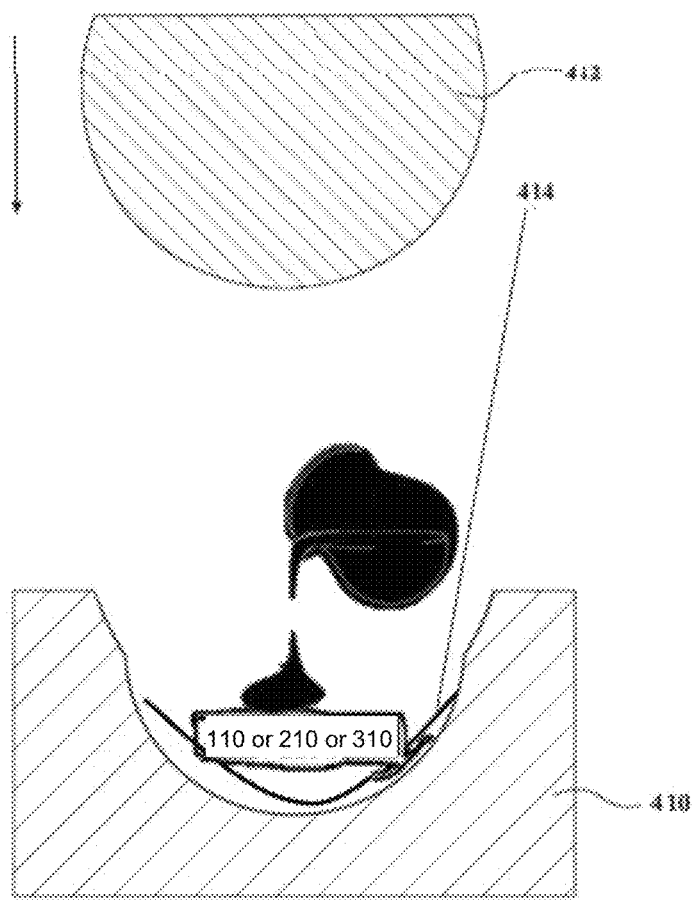
Figure 12C:
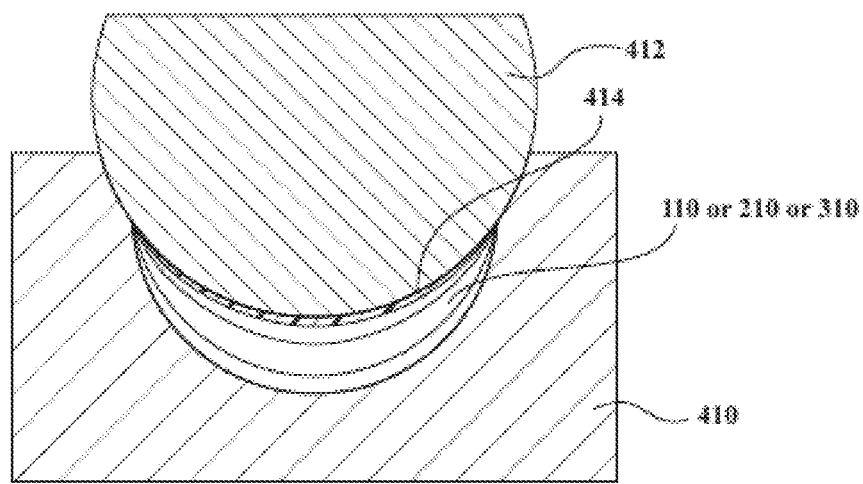
Figure 12D:
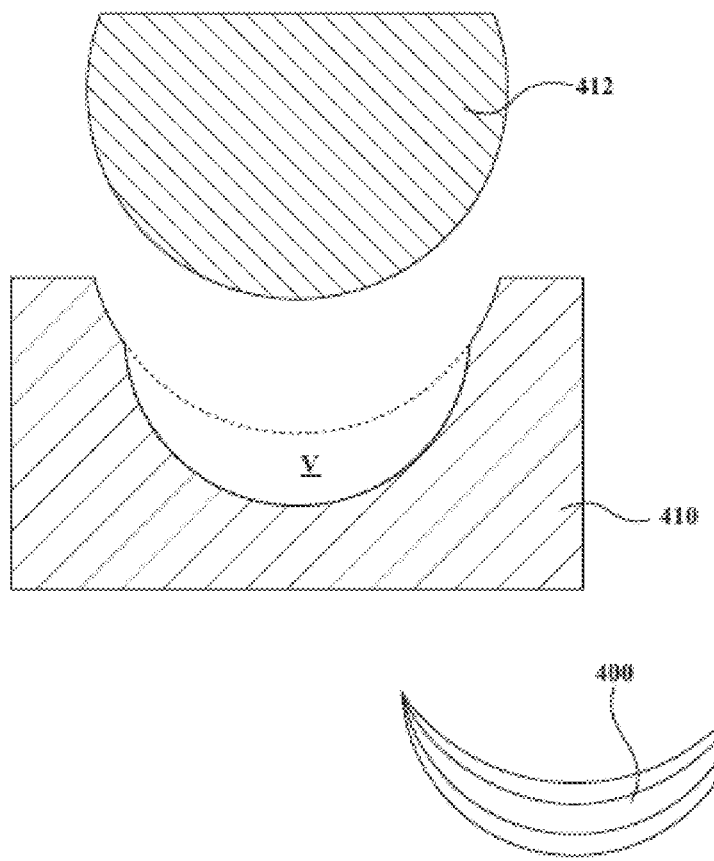

FIGS. 12A-D are a series of schematics showing melt formation or liquid composite molding (LCM) formation of a vehicle component 400. In FIG. 12A form or preform 110 or 210 or 310 or a combination thereof is intended to be brought into simultaneous contact with opposing mold platens 410 and 412 that define a cavity volume, V. The volume V corresponding in shape to the desired vehicle component. Alternatively, in FIG. 12B, form or preform 110 or 210 or 310 or a combination thereof is brought into contact with mold platen 410 and thermoset liquid resin 510 is poured on the preform 110 or 210 or 310 or a combination thereof. By selectively heating one or both of the platens 410 or 412 to a temperature sufficient to melt the thermoplastic content of the form or preform 110 or 210 or 310 or a combination thereof, a vehicle component is formed upon cooling the mass compressed within the platens 410 and 412 by temperature and pressure, as shown in FIG. 12C. In a specific inventive embodiment, a thermoplastic veil 414 is in contact one or both platens 410 and 412 to create a skin on the resulting vehicle component. In a specific inventive embodiment, the preform is overlaid with at least one fabric sheet 414 that is permeated by the resin. Upon opening the volume V, a completed vehicle component 400 is removed, as shown in FIG. 12D.

Figure 13A:
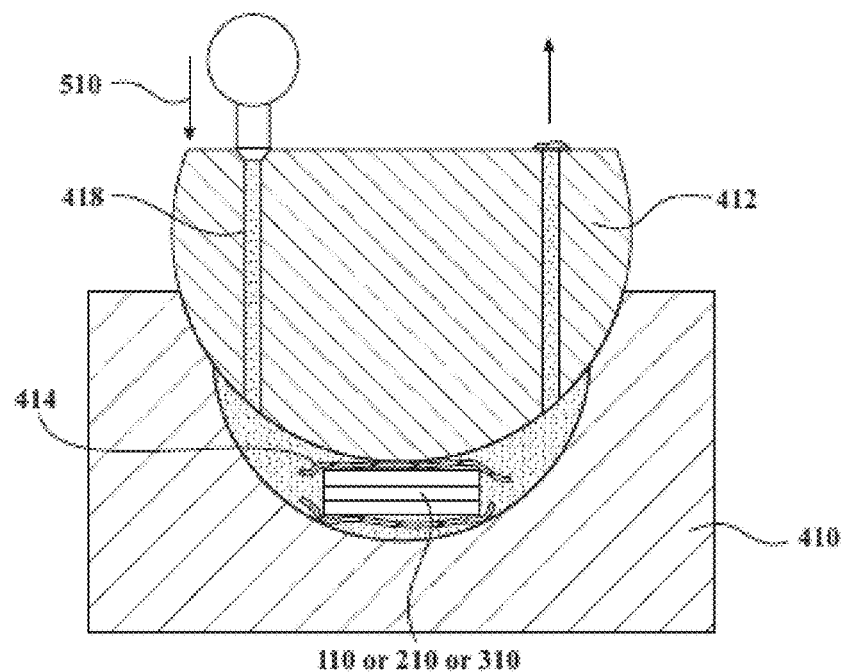
FIGS. 13A-13C are a schematic illustrating the steps of processing an inventive SCFBP preform into a vehicle component via resin transfer molding.
Figure 13B:
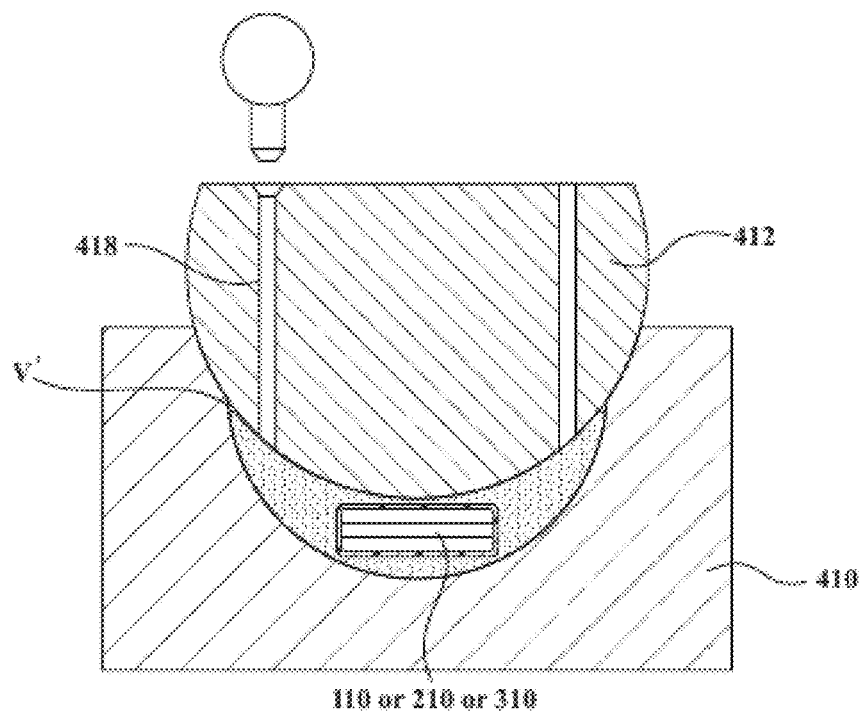
Figure 13C:
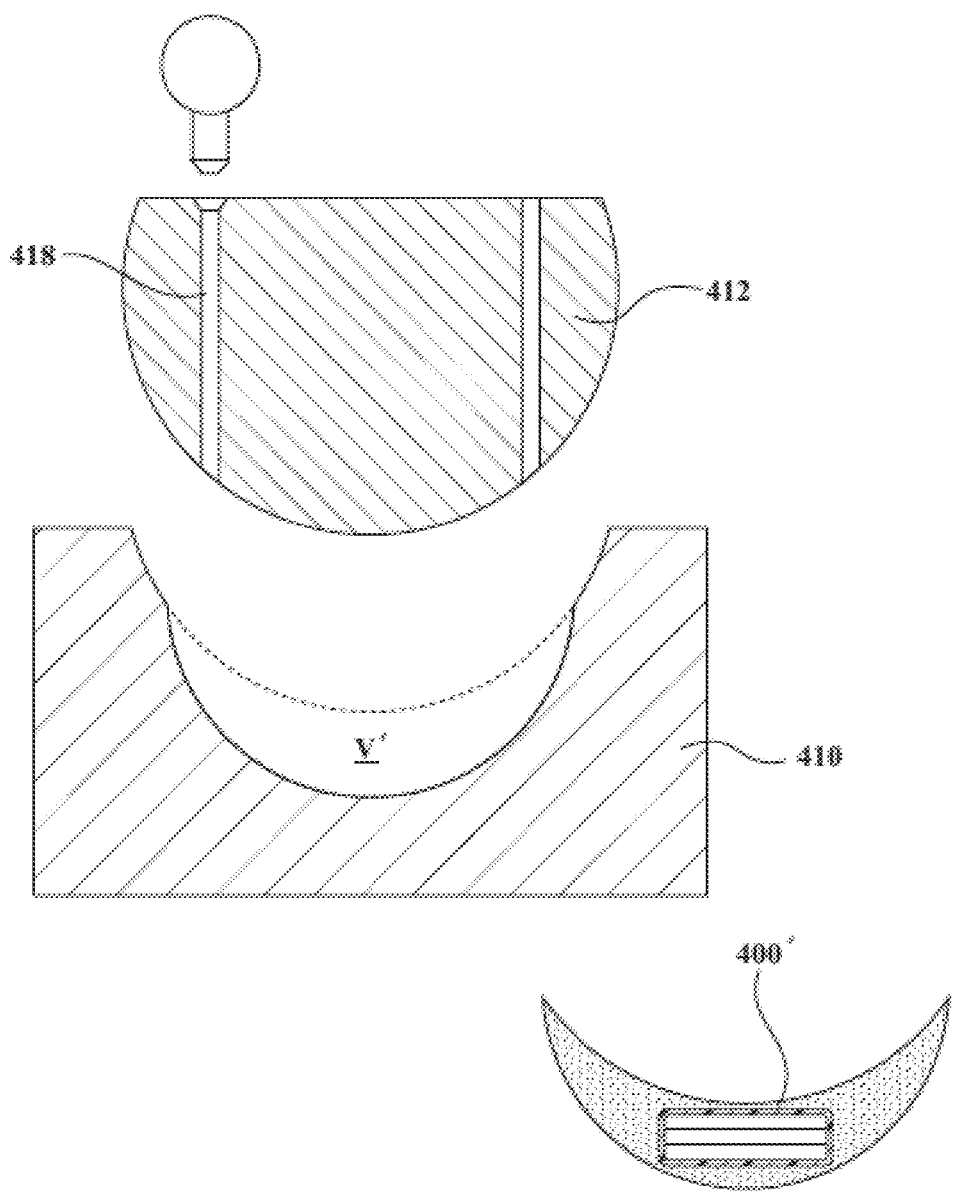

As shown in FIGS. 13A-C, in which like reference numerals have the meaning previously ascribed thereto a series of schematics illustrate RTM formation of a vehicle component 400'. In FIG. 13A, form or preform 110 or 210 or 310 or a combination thereof is brought into contact with mold platen 410 and opposing platen 412 is brought into contact to define the volume V'. The volume V' corresponding in shape to the desired vehicle component. A thermoset liquid resin 510 is injected through ports 418 into the volume V' to permeate the form or preform 110 or 210 or 310 or a combination thereof. In FIG. 13B, cure of the resin occurs with resort to the application of heat, pressure, cure catalyst, or a combination thereof, the resin infiltrates the preform 110 or 210 or 310 or a combination thereof and cures to form a matrix in a shape defining the vehicle component 400'. In a specific inventive embodiment, the preform is overlaid with at least one fabric sheet 414 that is permeated by the resin. Upon separating the platens 410 and 412, a completed vehicle component 400' is removed, as shown in FIG. 13C.

There are several types of RTM resin delivery systems available on the commercial market that can be employed in the present invention. The pump mechanism can be powered with one or a combination of pneumatic, hydraulic, or gear drive systems. Positive displacement pumping of the resin is well-suited for large of complex vehicle components 400' and is characterized by constant pressure and continuous resin flow while also affording computer control of the injection cycle.

It is appreciated that in some inventive embodiments one can maintain a predetermined hydrostatic resin pressure and adjust and display the temperature for viscosity control as well as for resin flow rate and volume control.

An exemplary RTM process according to the present invention includes, the (1) preform loading for structural applications at 10-65% by total weight percent of the vehicle component; (2) applying vacuum to promote resin flow for complete wet out of the preform; (3) resin viscosity less than 1000 cps allows lower injection pressure and faster injection, as does multiple port injection; (4) the mold platens are integrally heated to reduce cycle time and mold handling; (5) resin is previously degassed to minimize porosity and void content, unless a foaming agent is added; (6) hydrostatic pressure is held after resin injection to lower porosity content; and, (7) injection pressure is less than 10 atmospheres to allow a slow-moving resin flow front and to limit resin containing fibers to become inhomogeneous as to density, orientation, or both.

The foregoing description is illustrative of particular embodiments of the invention but is not meant to be a limitation upon the practice thereof. The following claims, including all equivalents thereof, are intended to define the scope of the invention.

The invention claimed is:
1. A form for a vehicle component comprising:
   a comingled fiber bundle composed of a reinforcement fiber, said reinforcement fiber being glass fibers, aramid fibers, carbon fibers, or a combination thereof, said comingled fiber bundle laid out in a two-dimensional base layer that defines a shape of the form, and where the form has a non-uniform distribution of reinforcement fibers therein to selectively toughen regions of the form;

a first successive layer formed with said comingled fiber bundle in contact with said two-dimensional layer, said comingled fiber bundle laid out in said first successive layer; and a second successive layer of said comingled fiber bundle in contact with said first successive layer and vertically displaced from said two-dimensional base layer.

2. The form of claim 1 wherein the comingled fiber bundle is further composed of thermoplastic fibers.

3. The form of claim 1 wherein said first successive layer has a first layer area enriched in said carbon fiber and said second successive layer has a second layer area enriched in said carbon fiber.

4. The form of claim 1 wherein the reinforcement fiber is exclusively only the glass fibers in at least one of said first successive layer or said second successive layer.

5. The form of claim 1 wherein the reinforcement fiber is exclusively only the carbon fibers in at least one of said first successive layer or said second successive layer.

6. The form of claim 1 wherein the first layer is enriched in carbon fiber along at least one edge of the shape.

7. The form of claim 1 further comprising one to seventeen additional successive layers placed on said second successive layer.

8. The form of claim 1 wherein the form is formed using selective comingled fiber bundle positioning (SCFBP), where the form is held together with a thread stitching.

9. The form of claim 1 further comprising an embedded reinforcement strut.

10. The form of claim 1 further comprising a partial top layer or one or more rows added in areas of need of reinforcement to the top surface of the form.

* * * * *